· (12) United States Patent
Maekawa

(10) Patent No.: US 9,866,037 B2
(45) Date of Patent: Jan. 9, 2018

(54) POWER RECEIVING DEVICE, WIRELESS POWER-SUPPLYING SYSTEM, AND COVER UNIT

(71) Applicant: IHI CORPORATION, Tokyo (JP)

(72) Inventor: Yuji Maekawa, Tokyo (JP)

(73) Assignee: IHI Corporation, Tokyo (JP)

( * ) Notice: Subject to any disclaimer, the term of this patent is extended or adjusted under 35 U.S.C. 154(b) by 268 days.

(21) Appl. No.: 14/829,813

(22) Filed: Aug. 19, 2015

(65) Prior Publication Data

US 2015/0357833 A1 Dec. 10, 2015

Related U.S. Application Data

(63) Continuation of application No. PCT/JP2014/059672, filed on Apr. 1, 2014.

(30) Foreign Application Priority Data

May 14, 2013 (JP) ................................ 2013-102060

(51) Int. Cl.
| | |
|---|---|
| *H01F 27/42* | (2006.01) |
| *H02J 5/00* | (2016.01) |
| *H02J 17/00* | (2006.01) |
| *B60L 11/18* | (2006.01) |
| *H02J 7/00* | (2006.01) |

(Continued)

(52) U.S. Cl.
CPC ............ *H02J 5/005* (2013.01); *B60L 11/182* (2013.01); *B60L 11/1824* (2013.01); *H02J 7/0042* (2013.01); *H02J 7/0047* (2013.01); *H02J 7/025* (2013.01); *H02J 17/00* (2013.01); *H02J 50/60* (2016.02); *H02J 50/70* (2016.02); *B60L 2230/00* (2013.01); *B60L 2270/147* (2013.01); *H02J 2007/0049* (2013.01); *Y02T 10/7005* (2013.01); *Y02T 10/7088* (2013.01);
(Continued)

(58) Field of Classification Search
CPC ........ H02J 7/0042; H02J 7/0047; H02J 7/025; H02J 50/60; H02J 50/70; H02J 5/005; B60L 11/182; B60L 11/1824
USPC ....... 307/104, 9.1, 10.1, 10.7; 320/103, 104, 320/107–111
See application file for complete search history.

(56) References Cited

U.S. PATENT DOCUMENTS 9,327,608 B2 * 5/2016 Gibbons, Jr. ....... B60L 11/1829
2010/0065352 A1 3/2010 Ichikawa
(Continued)

FOREIGN PATENT DOCUMENTS

| CN | 2440693 Y | 8/2001 |
|---|---|---|
| DE | 102010020122 A1 | 11/2011 |

(Continued)

OTHER PUBLICATIONS

International Search Report, PCT/JP2014/059672, Jun. 24, 2014, 1 pg.

*Primary Examiner* — Thomas Skibinski
(74) *Attorney, Agent, or Firm* — Volpe and Koenig, P.C.

(57) ABSTRACT

A wireless power-supplying system includes a power-supplying coil disposed on a ground contact surface side, a power-receiving coil mounted on a movable body and to which power is wirelessly supplied from the power-supplying coil, a cover member provided in the movable body and configured to be opened and closed and cover the power-receiving coil in a closed state, and a bag configured to expand and contract and to open and close the cover member.

14 Claims, 4 Drawing Sheets

(51) Int. Cl.
*H02J 7/02* (2016.01)
*H02J 50/70* (2016.01)
*H02J 50/60* (2016.01)

(52) U.S. Cl.
CPC ............ *Y02T 90/121* (2013.01); *Y02T 90/122* (2013.01); *Y02T 90/14* (2013.01)

(56) References Cited

U.S. PATENT DOCUMENTS

| | | | |
|---|---|---|---|
| 2012/0200151 A1 | 8/2012 | Obayashi et al. | |
| 2013/0033227 A1* | 2/2013 | Gibbons, Jr. | B60L 11/1829 320/108 |
| 2013/0175987 A1* | 7/2013 | Amma | B60L 11/182 320/108 |
| 2014/0340035 A1* | 11/2014 | Maekawa | H01F 38/14 320/108 |
| 2015/0069833 A1* | 3/2015 | Yuasa | B60L 11/182 307/10.1 |
| 2015/0200550 A1* | 7/2015 | Maekawa | B60L 11/182 307/104 |
| 2015/0352964 A1* | 12/2015 | Maekawa | B60L 11/1805 307/10.1 |
| 2016/0013664 A1* | 1/2016 | Maekawa | H02J 5/005 307/104 |
| 2016/0144727 A1* | 5/2016 | Tokura | H01F 38/14 307/104 |
| 2016/0176299 A1* | 6/2016 | Kautz | B60L 11/182 307/9.1 |

FOREIGN PATENT DOCUMENTS

| | | |
|---|---|---|
| EP | 0874378 A2 | 10/1998 |
| JP | 2010-070048 A | 4/2010 |
| JP | 2010-087353 A | 4/2010 |
| JP | 2012-196015 A | 10/2012 |
| JP | 2013-021886 A | 1/2013 |
| JP | 2013-059239 A | 3/2013 |
| WO | 2012/096316 A1 | 7/2012 |
| WO | 2013/118745 A1 | 8/2013 |

* cited by examiner

POWER RECEIVING DEVICE, WIRELESS POWER-SUPPLYING SYSTEM, AND COVER UNIT

TECHNICAL FIELD

The present disclosure relates to a wireless power-supplying system. This application is a continuation application based on a PCT Patent Application No. PCT/JP2014/059672, filed on Apr. 1, 2014, whose priority is claimed on Japanese Patent Application No. 2013-102060, filed on May 14, 2013. The contents of both the PCT application and the Japanese Patent Application are incorporated herein by reference.

BACKGROUND ART

In recent years, for example, as shown in Patent Documents 1 to 4, wireless power-supplying systems configured to wirelessly supply power from a power-supplying-side coil (power-supplying coil) to a power-receiving-side coil (power-receiving coil) have been used. For example, technology for supplying power to a battery mounted on a vehicle such as an electric vehicle (EV) or a hybrid vehicle (HV) using the wireless power-supplying systems has been proposed.

DOCUMENT OF RELATED ART

PATENT DOCUMENTS

Patent Document 1

Japanese Unexamined Patent Application, First Publication No. 2010-87353

Patent Document 2

Japanese Unexamined Patent Application, First Publication No. 2013-59239

Patent Document 3

Japanese Unexamined Patent Application, First Publication No. 2012-196015

Patent Document 4

Japanese Unexamined Patent Application, First Publication No. 2013-21886

SUMMARY OF DISCLOSURE

Technical Problem

However, on the bottom of the vehicle, the power-receiving coil is installed as it is or molded in a resin. Thus, when the bottom of the vehicle is grazed or hit by a foreign object (such as a small stone), the power-receiving coil is damaged and the damage is likely to be a factor which degrades power supply.

The present disclosure is conceived in view of the above-described problem, and an object of the disclosure is to prevent damage to a power-receiving coil mounted on a vehicle and constantly enable appropriate power supply.

Solution to Problem

The present disclosure adopts the following configurations as means for achieving the above-described object.

According to the first aspect of the present disclosure, a power-receiving device includes: a power-receiving coil mounted on a movable body and to which power is wirelessly supplied from a power-supplying coil; a cover member provided in the movable body and configured to be opened and closed and cover the power-receiving coil in a closed state; and a bag configured to expand and contract and to open and close the cover member.

According to the second aspect of the present disclosure, in the first aspect, a plurality of cover members are provided.

According to the third aspect of the present disclosure, in the second aspect, the bag is provided for each cover member.

According to the fourth aspect of the present disclosure, in the first aspect, the power-receiving device includes: a biasing means configured to bias the cover member so that the cover member is in the closed state.

According to the fifth aspect of the present disclosure, in the second aspect, a biasing means configured to bias the cover member so that the cover member is in the closed state is provided in each of the plurality of cover members.

According to the sixth aspect of the present disclosure, in the third aspect, a biasing means configured to bias the cover member so that the cover member is in the closed state is provided in each of the plurality of cover members.

According to the seventh aspect of the present disclosure, in the first aspect, the cover member is adhered to the bag.

According to the eighth aspect of the present disclosure, in the first aspect, the bag is formed of a rubber material having elasticity.

According to the ninth aspect of the present disclosure, in the first aspect, the bag is formed in a predetermined metal except for a portion corresponding to a magnetic path between the power-supplying coil and the power-receiving coil.

According to the tenth aspect of the present disclosure, in the first aspect, the cover member is formed of a harder metal than the power-receiving coil.

According to the eleventh aspect of the present disclosure, in the second aspect, each of the plurality of cover members has approximately an isosceles triangle shape.

According to the twelfth aspect of the present disclosure, in the fifth aspect, the biasing means provided in each of the plurality of cover members is a spring, and the spring constant of each spring is different.

According to the thirteenth aspect of the present disclosure, a wireless power-supplying system includes: a power-supplying coil disposed on a ground contact surface; a power-receiving coil mounted on a movable body and to which power is wirelessly supplied from the power-supplying coil; a cover member provided in the movable body and configured to be opened and closed and cover the power-receiving coil in a closed state; and a bag configured to expand and contract and to open and close the cover member.

According to the fourteenth aspect of the present disclosure, a cover unit for a power-receiving coil mounted on a movable body and to which power is wirelessly supplied from a power-supplying coil includes: a cover member provided in the movable body and configured to be opened and closed and cover the power-receiving coil in a closed state; and a bag configured to expand and contract and to open and close the cover member.

Effects of the Disclosure

According to the present disclosure, a cover member is provided which is configured to be opened and closed and to cover the power-receiving coil in a closed state. In addition, a bag is provided which is configured to expand or contract in order to open or close the cover member. According to the above-described present disclosure, the cover member is opened or closed through expansion or contraction of the bag. Thus, it is possible to protect the power-receiving coil by closing the cover member while the vehicle runs and prevent the cover member from interfering with power supply by opening the cover member while power is supplied. Therefore, according to the present disclosure, it is possible to prevent damage to the power-receiving coil mounted on the vehicle and constantly perform appropriate power supply.

DESCRIPTION OF EMBODIMENTS

Hereinafter, an embodiment of a wireless power-supplying system according to the present disclosure will be described with reference to the drawings. In the following drawings, dimensions of each member are appropriately adjusted such that each member has a discernible size.

First Embodiment

Figure 1:
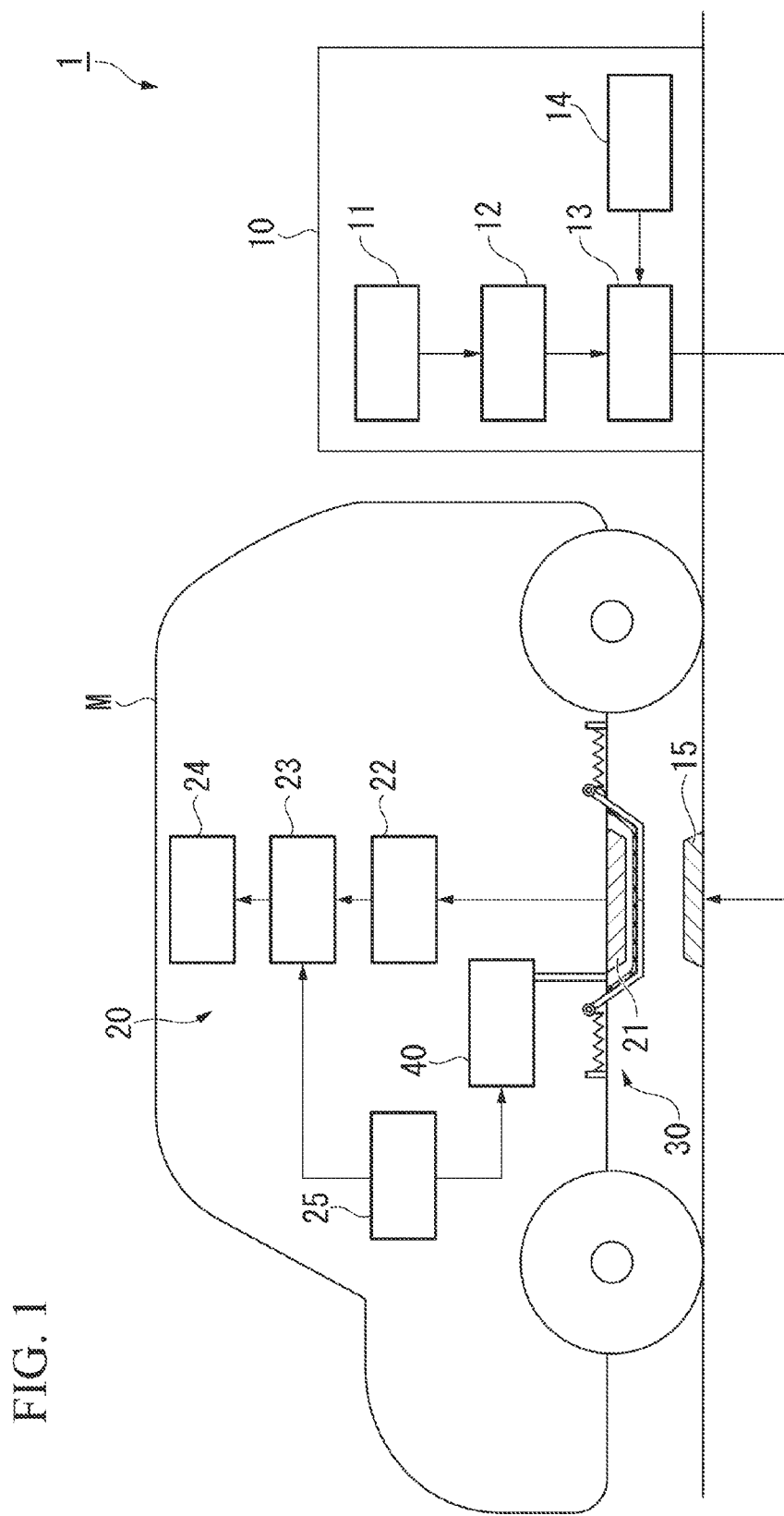
FIG. 1 is a block diagram showing a configuration of a main part of a wireless power-supplying system according to the first embodiment of the present disclosure.

FIG. 1 is a block diagram showing a configuration of a main part of a wireless power-supplying system 1 according to the first embodiment of the present disclosure. As shown in FIG. 1, the wireless power-supplying system 1 includes a power-supplying device 10 installed on the side of a ground surface and a power-receiving device 20 mounted on the side of a vehicle M (movable body), and wirelessly supplies power (electric power) from the power-supplying device 10 to the power-receiving device 20.

The power-supplying device 10 includes a power source 11, a rectifier circuit 12, a power-supplying circuit 13, a power supply control unit 14, and a power-supplying coil 15, generates power suitable for wireless power supply to the power-receiving device 20, and performs various types of control necessary in performing wireless power supply to the power-receiving device 20. Although an example in which the power-supplying device 10 is installed on the ground will be described in this embodiment, the power-supplying device 10 may be installed under the ground or above the vehicle M (for example, in a ceiling) and is assumed to be installed on a ground contact surface.

Output terminals of the power source 11 are connected to input terminals of the rectifier circuit 12, and the power source 11 supplies the rectifier circuit 12 with alternating current (AC) power necessary for power supply to the power-receiving device 20. This power source 11, for example, is an electrical grid configured to supply three-phase AC power of 200 V, 400 V, or the like or single-phase AC power of 100 V.

The input terminals of the rectifier circuit 12 are connected to the power source 11 and output terminals thereof are connected to the power-supplying circuit 13. The rectifier circuit 12 rectifies the AC power supplied from the power source 11 to convert the AC power into direct current (DC) power, and outputs the DC power obtained through the conversion to the power-supplying circuit 13.

Input terminals of the power-supplying circuit 13 are connected to the rectifier circuit 12 and output terminals thereof are connected to both ends of the power-supplying coil 15. The power-supplying circuit 13 converts the DC power from the rectifier circuit 12 into AC power and outputs the AC power obtained through the conversion to the power-supplying coil 15. Specifically, the power-supplying circuit 13 includes a resonance capacitor constituting a power-supplying-side resonance circuit along with the power-supplying coil 15 and converts the DC power from the rectifier circuit 12 into AC power (high-frequency power) having a higher frequency than the AC power of the power source 11 to output the high-frequency power to the power-supplying coil 15 under control of the power supply control unit 14. The power supply control unit 14 causes the power-supplying circuit 13 to generate power to be supplied to the power-receiving device 20. This power supply control unit 14 includes a central processing unit (CPU), a memory, or the like, and performs various types of control described above based on a prepared control program.

The power-supplying coil 15 includes a solenoid type coil having a predefined coil shape.

Also, the power-supplying coil 15 may be provided to be integrated with a cover formed of a non-magnetic material such as plastic for molding the power-supplying coil 15. This power-supplying coil 15 wirelessly supplies power to the power-receiving device 20 by generating a magnetic field according to high-frequency power supplied from the power-supplying circuit 13.

The vehicle M is a vehicle that is driven by a driver and runs on a road. For example, the vehicle M is an EV or an HV including a traction motor as a power generation source. As shown in FIG. 1, the vehicle M includes a power-receiving device 20. Although not shown in FIG. 1, the vehicle M includes components necessary for running such as an engine, the aforementioned traction motor, an operating handle, and a brake.

The power-receiving device 20 includes a power-receiving coil 21, a power-receiving circuit 22, a charging circuit 23, a battery 24, a power reception control unit 25, and a cover unit 30. The power-receiving coil 21 includes a solenoid-type coil having substantially the same coil shape as the above-described power-supplying coil 15. Also, the power-receiving coil 21 may be provided to be integrated with a cover formed of a non-magnetic material such as a plastic for molding the power-receiving coil 21. This power-receiving coil 21 is provided on the bottom of the vehicle M in a posture in which the coil axis is in an up-down direction (vertical direction) so that the power-receiving coil 21 can face the power-supplying coil 15. Both ends of the power-receiving coil 21 are connected to input terminals of the power-receiving circuit 22, and, when a magnetic field of the power-supplying coil 15 acts on the power-receiving coil 21, an electromotive force is generated, and the power-receiving coil 21 outputs the generated electromotive force to the power-receiving circuit 22.

The input terminals of the power-receiving circuit 22 are connected to both ends of the power-receiving coil 21, and output terminals thereof are connected to input terminals of the charging circuit 23. The power-receiving circuit 22 converts AC power supplied from the power-receiving coil 21 into DC power to output the DC power obtained through the conversion to the charging circuit 23. This power-receiving circuit 22 includes a resonance capacitor constituting a power-receiving-side resonance circuit along with the power-receiving coil 21. Also, the electrostatic capacitance of the resonance capacitor of the power-receiving circuit 22 is set so that a resonance frequency of the power-receiving-side resonance circuit is the same as a resonance frequency of the above-described power-supplying-side resonance circuit.

The input terminals of the charging circuit 23 are connected to output terminals of the power-receiving circuit 22 and output terminals thereof are connected to input terminals of the battery 24. The charging circuit 23 charges the battery 24 with power (DC power) from the power-receiving circuit 22. The battery 24 is a rechargeable battery (for example, a secondary battery such as a lithium ion battery or a nickel-metal hydride battery) mounted on the vehicle M, and supplies power to a traction motor (not shown) or the like. The power reception control unit 25 includes a CPU, a memory, and the like, and controls the charging circuit 23 based on a prepared power reception control program. In addition, the power reception control unit 25 causes a gas supply and exhaust device 40 to expand or contract a balloon 33 of the cover unit 30 to be described below.

Figure 2A:
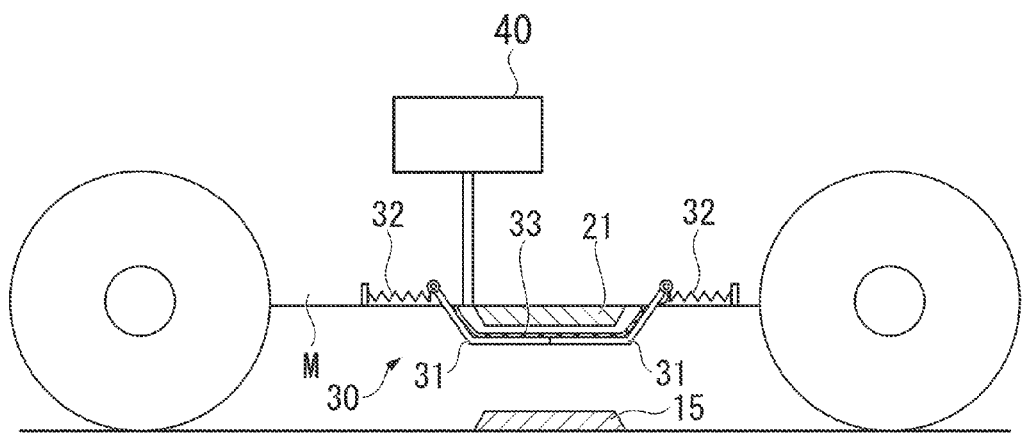
FIG. 2A is an enlarged schematic diagram including a cover unit provided in the wireless power-supplying system according to the first embodiment of the present disclosure and showing a closed state of a cover member of the cover unit.
Figure 2B:
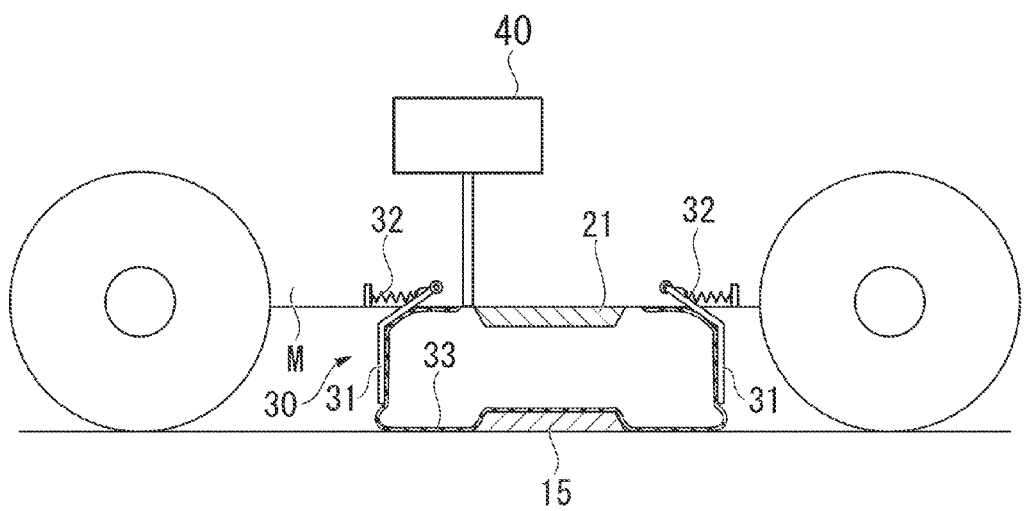
FIG. 2B is an enlarged schematic diagram including the cover unit provided in the wireless power-supplying system according to the first embodiment of the present disclosure and showing an open state of the cover member of the cover unit.

FIGS. 2A and 2B are enlarged schematic diagrams including the cover unit 30. As shown in FIGS. 2A and 2B, the cover unit 30 includes a cover member 31, a spring 32 (biasing means), and the balloon 33 (bag), and is used for a power-receiving coil to which power is wirelessly supplied from the power-supplying coil. Also, in FIGS. 2A and 2B, FIG. 2A shows a closed state of the cover member 31 and FIG. 2B shows an open state of the cover member 31.

Figure 3:
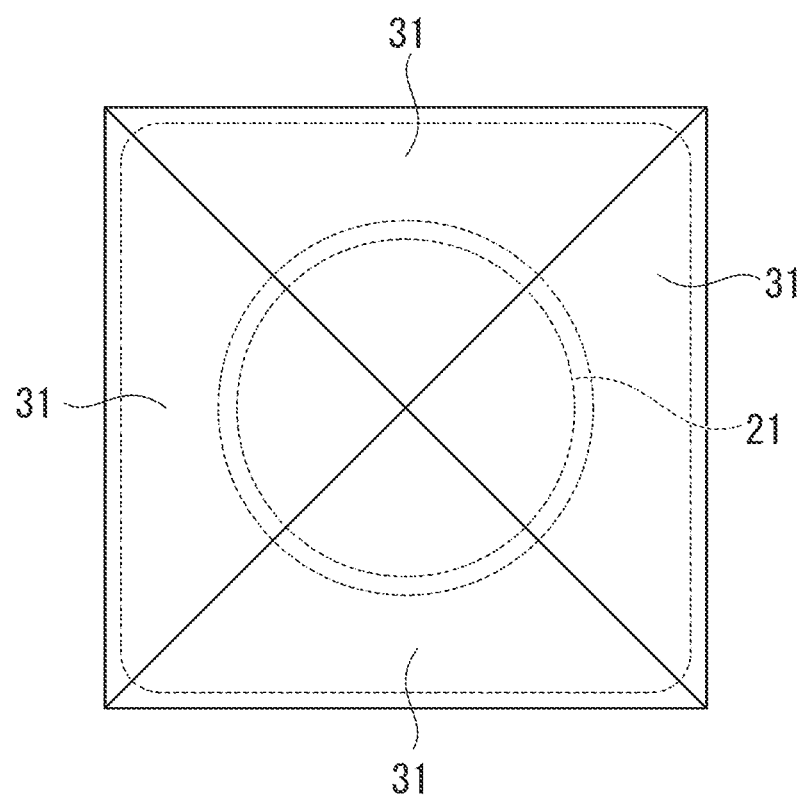
FIG. 3 is a schematic diagram of the cover member of the cover unit provided in the wireless power-supplying system according to the first embodiment of the present disclosure viewed from below.

The cover member 31 is attached to the bottom of the vehicle M via a hinge so as to be opened and closed. FIG. 3 is a front view of the cover member 31 of the closed state viewed from a ground surface side. As shown in FIG. 3, the cover member 31 is attached to the vehicle M so as to cover the power-receiving coil 21 in the closed state. In this embodiment, as shown in FIG. 3, four cover members 31 are provided and each cover member 31 has approximately the shape of an isosceles triangle. When all these cover members 31 are in the closed state, the cover members 31 wholly form a rectangular shape as shown in FIG. 3 to cover the entire power-receiving coil 21. This cover member 31 protects the power-receiving coil 21 and, for example, is formed of a harder metal than the power-receiving coil 21.

The spring 32 is provided for each cover member 31, and is a compression spring having one end fixed to the cover member 31 and the other end fixed to a vehicle body of the vehicle M as shown in FIGS. 2A and 2B. This spring 32 biases the cover member 31 so that the cover member 31 is in a posture (posture shown in FIG. 2A) of the closed state.

The balloon 33 is fixed to the bottom of the vehicle M to cover the power-receiving coil 21, expanded (swollen) by internally supplying the gas from the gas supply and exhaust device 40, and contracted (shrunken) by suctioning the supplied gas to the gas supply and exhaust device 40. As shown in FIGS. 2A and 2B, this balloon 33 is held between the power-receiving coil 21 and the cover member 31.

As shown in FIG. 2B, this balloon 33 expands to press the cover member 31 and maintains the cover member 31 in the open posture. In addition, the balloon 33 contracts to set the cover member 31 in the closed posture. That is, the balloon 33 expands or contracts to open or close the cover member 31. In addition, the balloon 33, for example, is formed of a rubber material or the like having elasticity. Also, the balloon 33 may be formed using a predetermined metal, for example, aluminum or copper, except for a portion corresponding to a magnetic path connecting the power-supplying coil 15 and the power-receiving coil 21. Thereby, it is possible to reduce a leaked electromagnetic field.

The gas supply and exhaust device 40 performs the supply and exhaust of the gas to and from the balloon 33 under control of the power reception control unit 25. As shown in FIG. 1, this gas supply and exhaust device 40 is connected to the balloon 33 via a gas supply and exhaust pipe and performs the supply and exhaust of the gas to and from the balloon 33 via the gas supply and exhaust pipe.

In the wireless power-supplying system 1 of this embodiment, the power reception control unit 25 in the power-receiving device 20 causes the charging circuit 23 to stop when no power is supplied (for example, when the driver performs normal driving of the vehicle M). At this time, the power reception control unit 25 causes the gas supply and exhaust device 40 to exhaust the gas within the balloon 33 to the outside of the balloon 33. Thus, each cover member 31 is set in the closed state as shown in FIG. 2A through a biasing force of the spring 32 and covers the power-receiving coil 21. In addition, when no power is supplied (that is, when the vehicle M which is a power supply target is not stopped at a parking/stop position), the power supply control unit 14 in the power-supplying device 10 causes the power-supplying circuit 13 to stop.

Thereafter, when the driver drives the vehicle M to a place in which the power-supplying coil 15 is installed and stops the vehicle M in the place, an installation position of the power-supplying coil 15 is recognized by the power reception control unit 25. Also, a method of recognizing the installation position of the power-supplying coil 15, for example, includes a method of recognizing the installation position based on an output of a position sensor such as a sound wave sensor or an optical sensor (not shown). When it is detected that the power-receiving coil 21 installed in the vehicle M is above the power-supplying coil 15 based on the recognized installation position of the power-supplying coil 15, the power reception control unit 25 causes the gas to be supplied from the gas supply and exhaust device 40 to the balloon 33. Thereby, the balloon 33 expands and the cover member 31 is set in the open state.

In the power supply control unit 14 of the power-supplying device 10, the position of the vehicle M is recognized by the power supply control unit 14 based on an output of a position sensor such as a sound wave sensor or an optical sensor (not shown) as in the vehicle M.

When the above operation is finished, the power-supplying circuit 13 of the power-supplying device 10 is controlled by the power supply control unit 14, so that a power-supplying operation is started. Thereby, power is wirelessly supplied from the power-supplying coil 15 to the power-receiving coil 21 installed in the vehicle M. When the power is wirelessly supplied, the power reception control unit 25 causes the charging circuit 23 to charge the battery 24 while monitoring a charged state of the battery 24 in the power-receiving device 20.

When it is detected that the battery 24 is in a fully-charged state, the power reception control unit 25 performs control of stopping the charging circuit 23 and notifies an indicator (not shown) or the like (for example, an indicator which indicates the charged state of the battery 24 and is provided in a driver seat) of the fact that the battery 24 is in the fully-charged state. Through this notification, the driver can recognize that the battery 24 is in the fully-charged state.

The power supply control unit 14 of the power-supplying device 10 determines whether power supply has been finished while the power supply is wirelessly performed. Here, the determination of whether the power supply has been finished, for example, can be performed based on whether an amount of power supply to the vehicle M has rapidly decreased. When it is determined that the power supply has not been finished, the power supply control unit 14 causes the power-supplying circuit 13 to continue the wireless power supply. When it is determined that the power supply has been finished, the power supply control unit 14 causes the power-supplying circuit 13 to stop the power-supplying operation.

When the power-supplying operation stops, the power reception control unit 25 causes the gas supply and exhaust device 40 to exhaust the gas supplied inside the balloon 33 and contract the balloon 33. Thereby, as shown in FIG. 2A, the cover member 31 is in the closed state and the driver can drive the vehicle M away from the installation place of the power-supplying coil 15.

The wireless power-supplying system 1 of this embodiment described above includes the cover member 31 configured to be opened and closed and cover the power-receiving coil 21 in the closed state. In addition, the wireless power-supplying system 1 includes the balloon 33 configured to open or close the cover member 31 through expansion or contraction. According to the wireless power-supplying system 1 of this embodiment as described above, the cover member 31 is opened or closed through the expansion or contraction of the balloon 33. Thus, it is possible to protect the power-receiving coil 21 by closing the cover member 31 while the vehicle M is driven and prevent the cover member 31 from interfering with power supply by opening the cover member 31 while power is supplied. Therefore, according to the wireless power-supplying system 1 of this embodiment, it is possible to prevent damage to the power-receiving coil 21 mounted in the vehicle M and constantly perform appropriate power supply.

In addition, in the wireless power-supplying system 1 of this embodiment, a plurality of cover members 31 are provided. Thus, as compared with the aspect in which one cover member 31 is opened or closed, it is possible to reduce the movable range of the cover member 31 in a height direction. Thus, the wireless power-supplying system 1 of this embodiment is also applicable to a vehicle, such as a general passenger car, having a low height from the base of the vehicle M to a ground surface.

In addition, the wireless power-supplying system 1 of this embodiment includes a spring 32 configured to bias the cover member 31 so that the cover member is in the closed state. Thus, when no power is supplied to the power-receiving device 20, it is possible to reliably close the cover member 31.

Second Embodiment

Next, the second embodiment of the present disclosure will be described. Also, in the description of this second embodiment, parts similar to those in the above-described first embodiment will be omitted or simplified.

Figure 4A:
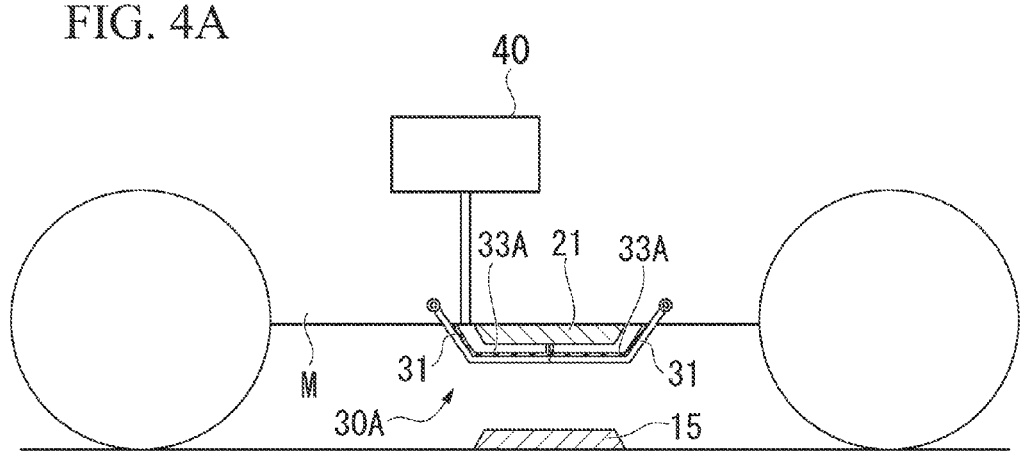
FIG. 4A is an enlarged schematic diagram including a cover unit provided in a wireless power-supplying system according to the second embodiment of the present disclosure and showing a closed state of a cover member of the cover unit.
Figure 4B:
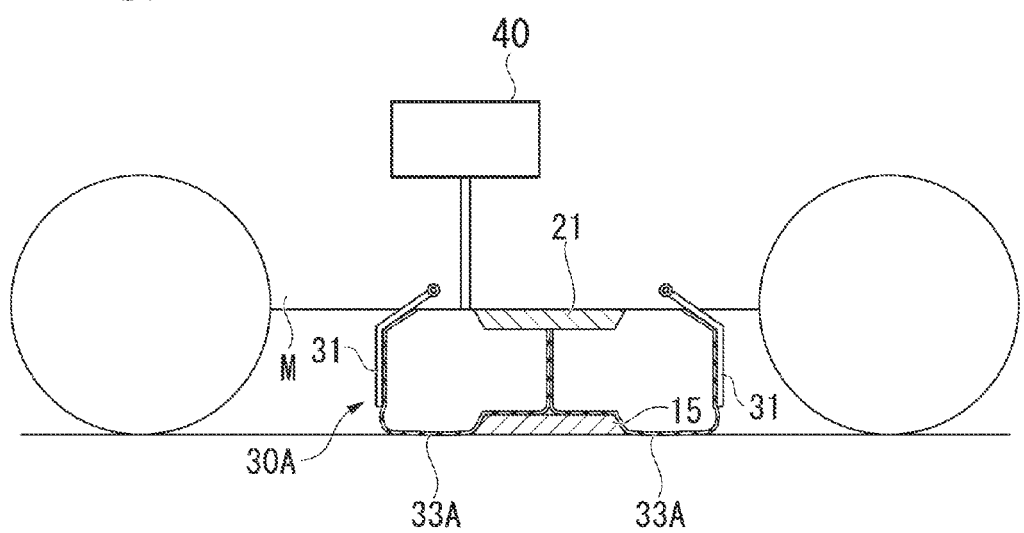
FIG. 4B is an enlarged schematic diagram including the cover unit provided in the wireless power-supplying system according to the second embodiment of the present disclosure and showing an open state of the cover member of the cover unit.

FIGS. 4A and 4B are enlarged schematic diagrams including a cover unit 30A of the wireless power-supplying system of this embodiment. As shown in FIGS. 4A and 4B, the cover unit 30A includes a cover member 31 and a balloon 33A (bag). Also, in FIGS. 4A and 4B, FIG. 4A shows the closed state of the cover member 31 and FIG. 4B shows the open state of the cover member 31.

As shown in FIGS. 4A and 4B, the wireless power-supplying system of this embodiment does not include the above-described spring 32, and the balloon 33A is provided for each cover member 31. In addition, each cover member 31 is adhered to one of the balloons 33A.

Because each cover member 31 is adhered to one of the balloons 33A according to the wireless power-supplying system of this embodiment having the above-described configuration, the cover member 31 is set in the closed state as shown in FIG. 4A when the balloon 33A has contracted, and the cover member 31 is set in the open state as shown in FIG. 4B when the balloon 33A has expanded. Thus, it is possible to open or close the cover member 31 even when no spring 32 is used.

In addition, according to the wireless power-supplying system of this embodiment, the balloon 33A is provided for each cover member 31. Thus, the expansion and contraction of the balloon 33A are individually performed for each balloon 33A, so that it is possible to individually open and close each cover member 31. When the balloon 33A has contracted, the balloon 33A is likely to be sandwiched between the cover members 31. However, this risk can be avoided by individually opening and closing each cover member 31. In addition, because it is possible to shift the timing of closing of each cover member 31, for example, it is possible to set sizes of the cover members 31 so that the cover members overlap in the closed state.

While preferred embodiments of the present disclosure have been described above with reference to the appended drawings, the present disclosure is not limited to the above-described embodiments. Various shapes and combinations of the constituent members shown in the embodiments described above refer only to single examples, and may be altered in various ways based on design requirements and the like without departing from the subject matter of the present disclosure.

For example, in the above-described first embodiment, a spring constant may be different between the springs 32 connected to the cover members 31. In this case, when the balloon 33 contracts, it is possible to shift the timing at which each cover member 31 closes. Thus, for example, it is also possible to set sizes of the cover members 31 so that the cover members 31 overlap in the closed state.

In addition, in the above-described embodiment, the shape of the cover member 31 may be a shape which completely surrounds the peripheries of the power-receiving coil 21 and the power-supplying coil 15 in the open state. In this aspect, the cover member 31 is made of a metal as in the above-described embodiment, so that it is possible to further reduce a leaked electromagnetic field. In addition, a clothlike shielding film which covers the gap among the cover members 31 in the open state may be installed. By forming a shielding film of aluminum or copper, it is possible to prevent an electromagnetic field from leaking from the gap among the cover members 31.

In addition, in the above-described embodiment, a balloon and a gas supply and exhaust device may be further provided on the side of the power-supplying coil 15. In addition, a communication antenna may be installed within the balloon 33. In addition, by supplying powder inside the expanded balloon 33 and then suctioning the gas within the balloon 33, the balloon 33 and the power-supplying coil 15 may be rigidly fixed through a jamming transition phenomenon.

In addition, a configuration in which the movable body of the present disclosure is a vehicle has been described in the above-described embodiment. However, the present disclosure is not limited thereto and the movable body of the present disclosure may be an underwater movable body.

INDUSTRIAL APPLICABILITY

According to the present disclosure, it is possible to prevent damage to a power-receiving coil mounted on a vehicle and constantly enable appropriate power supply.

The invention claimed is:

1. A power-receiving device comprising:
a power-receiving coil mounted on a movable body and to which power is wirelessly supplied from a power-supplying coil;
a cover member provided in the movable body and configured to be opened and closed and cover the power-receiving coil in a closed state; and
a bag configured to expand and contract and to open and close the cover member.

2. The power-receiving device according to claim 1, wherein a plurality of cover members are provided.

3. The power-receiving device according to claim 2, wherein the bag is provided for each cover member.

4. The power-receiving device according to claim 3, wherein a biasing means configured to bias the cover member so that the cover member is in the closed state is provided in each of the plurality of cover members.

5. The power-receiving device according to claim 2, wherein a biasing means configured to bias the cover member so that the cover member is in the closed state is provided in each of the plurality of cover members.

6. The power-receiving device according to claim 5,
wherein the biasing means provided in each of the plurality of cover members is a spring, and
wherein a spring constant of each spring is different.

7. The power-receiving device according to claim 2, wherein each of the plurality of cover members has approximately an isosceles triangle shape.

8. The power-receiving device according to claim 1, comprising:
a biasing means configured to bias the cover member so that the cover member is in the closed state.

9. The power-receiving device according to claim 1, wherein the cover member is adhered to the bag.

10. The power-receiving device according to claim 1, wherein the bag is formed of a rubber material having elasticity.

11. The power-receiving device according to claim 1, wherein the bag is formed of a predetermined metal except for a portion corresponding to a magnetic path between the power-supplying coil and the power-receiving coil.

12. The power-receiving device according to claim 1, wherein the cover member is formed of a harder metal than the power-receiving coil.

13. A wireless power-supplying system comprising:
a power-supplying coil disposed on a ground contact surface;
a power-receiving coil mounted on a movable body and to which power is wirelessly supplied from the power-supplying coil;
a cover member provided in the movable body and configured to be opened and closed and cover the power-receiving coil in a closed state; and
a bag configured to expand and contract and to open and close the cover member.

14. A cover unit for a power-receiving coil mounted on a movable body and to which power is wirelessly supplied from a power-supplying coil, the cover unit comprising:
a cover member provided in the movable body and configured to be opened and closed and cover the power-receiving coil in a closed state; and
a bag configured to expand and contract and to open and close the cover member.

* * * * *